United States Patent Office 3,399,158
Patented Aug. 27, 1968

3,399,158
COALESCING AGENTS FOR EMULSION PAINTS
John Jackson Huitson, Banstead, Surrey, England, assignor to The Distillers Company Limited, Edinburgh, Scotland, a British company
No Drawing. Filed Mar. 26, 1965, Ser. No. 443,099
Claims priority, application Great Britain, Apr. 2, 1964, 13,580/64
6 Claims. (Cl. 260—29.6)

The present invention relates to copolymer emulsion paints, and in particular to the use in such paints of selected solvents to facilitate film formation and coalescence.

Copolymer emulsion paints are based on copolymers of vinyl acetate or alkylacrylates with other monomers, and such paints do not form films readily, especially at low temperatures. To facilitate film formation, solvents such as butyl digol acetate have been added to the paint formulation, which solvents are referred to hereafter as coalescing agents. When emulsion paints containing such known coalescing agents are applied to non-porous substrates the coalescing agents are effective in promoting film formation at temperatures close to, or somewhat lower than 0° C. If, however, they are applied to porous substrates, such as plaster, brickwork, plaster board and asbestos board, the choice of coalescing agent is critical since many coalescing agents which are satisfactory on non-porous substrates are ineffective on porous substrates. It is an object of the present invention to provide a copolymer emulsion paint with good film-forming properties, particularly on the porous substrates to which emulsion paints are most generally applied.

According to the present invention a copolymer emulsion paint comprises an aqueous coating emulsion, based on a copolymer of vinyl acetate or an alkyl acrylate with at least one other monomer, and an effective amount of a diester of an aliphatic dicarboxylic acid, said acid having from 2 to 6 carbon atoms per molecule, as a coalescing agent.

The aqueous coating emulsion of the present invention may, for example, be a conventional copolymer emulsion paint and may contain, in addition the copolymer and water any of the known fillers, pigments and additives.

The diester may be prepared by reaction of a suitable alcohol with the aliphatic dicarboxylic acid. Suitable acids include oxalic, malonic, succinic, glutaric and adipic acids. Mixtures of any two or more of these acids, such as the mixed acids obtained as by-products in the production of adipic acid may also be employed. The alcohol from which the diester is derived may be any straight or branched chain alcohol such as methanol, ethanol, isopropanol or isobutanol, or a mixture of two or more such alcohols. It is preferred to select the alcohol such that the total number of carbon atoms in the diester is within the range 6–18. Where a mixture of diesters is employed, the total number of carbon atoms should be an average calculated on a molar basis and within the range 6–18. The alcohol may also, if desired, be an alkanol containing an alkoxy group as a substituent or it may be an alicyclic alcohol.

Preferred coalescing agents are dimethyl succinate, diethyl succinate and diisopropyl succinate.

The effective amount of diester coalescing agent present in the copolymer emulsion paint may vary within moderately wide limits, for example from 0.5% to 7% by weight based on the weight of the total paint formulation.

The invention is illustrated by the following examples. In the examples, the suitability of various substances as coalescing agents is assessed by means of the following test. Asbestos board, typical of the material used to form ceilings, is cooled in a refrigerator, for example to −2° C., and the paint is cooled to the same temperature. At this temperature the paint is applied uniformly to specimen pieces of the board and is allowed to dry without allowing the temperature to rise. Inspection of the dried paints shows the performance of the coalescing agent. The results of these tests are recorded as "Degrees of Coalescence" whether incomplete (I) or complete (C). When coalescence is incomplete the paint film is not uniform and continuous but contains cracks and fissures.

Example 1

An emulsion paint was prepared by adding diethyl succinate in an amount of 2.0% by weight, relative to the weight of the paint, the latter being of the following composition:

| | Percent by wt. |
|---|---|
| Titanium dioxide | 27.3 |
| Blanc fixe | 2.8 |
| Tetrasodium pyrophosphate | 0.3 |
| Methyl cellulose | 0.6 |
| Vinyl acetate-acrylate copolymer (50% solids) | 39.2 |
| Water | 29.8 |

When subjected to the porous substrate test at −2° to −3° C, complete coalescence was realized.

Example 2

A series of emulsion paints containing 1.0, 1.5 and 2% by weight of diisopropyl succinate, as coalescing agent, was prepared by adding the latter to an emulsion paint of the composition set forth in Example 1.

The paints were subjected to the porous substrate test. The resuts are summarized in the following table. The results of tests on a commercially available coalescing agent, butyl digol acetate, are included for comparison.

TABLE

| Coalescing agent | Weight percent on paint | Degree of coalescence on porous substrate at −2° to −3° C. |
|---|---|---|
| Diisopropyl succinate | 1.0 | C |
| | 1.5 | C |
| | 2.0 | C |
| Butyl digol acetate | 1.0 | I |
| | 1.5 | I |
| | 2.0 | C |

Results comparable to those obtained with diethyl succinate and diisopropyl succinate are obtained when these are replaced by other coalescing agents according to this invention, e.g. diethyl oxalate, diethyl malonate, diisopropyl glutarate, dibutyl adipate, etc. or mixtures thereof.

I claim:

1. A copolymer emulsion paint which comprises an aqueous coating emulsion based on a copolymer of a monomer selected from the group consisting of vinyl acetate and alkyl acrylate with at least one other monomer and an effective amount of a diester of at least one aliphatic dicarboxylic acid selected from the group consisting of oxalic, malonic and succinic acids, said diesters having from 6 to 18 carbon atoms in the molecule, as a coalescing agent.

2. A copolymer emulsion paint as claimed in claim 1 wherein the diester is derived from reaction of the aliphatic dicarboxylic acid with an alcohol selected from the group consisting of methanol, ethanol, isopropanol, isobutanol and mixtures of such alcohols.

3. A copolymer emulsion paint as claimed in claim 2 wherein the diester is selected from the group consisting of dimethyl succinate, diethyl succinate and diisopropyl succinate.

4. A copolymer emulsion paint as claimed in claim 1 wherein the diester is derived from the reaction of the aliphatic dicarboxylic acid with an alcohol selected from the group consisting of an alkoxy alcohol and an alicyclic alcohol.

5. A copolymer emulsion paint as claimed in claim 1 wherein the diester is present in an amount from 0.5% to 7% by weight based on the weight of the total paint formulation.

6. A copolymer emulsion paint as claimed in claim 1 wherein the aqueous coating emulsion contains materials selected from the group consisting of fillers, pigments, additives and mixtures thereof.

References Cited

UNITED STATES PATENTS

| | | | |
|---|---|---|---|
| 2,601,315 | 6/1952 | Morrison et al. | 260—29.6 |
| 3,036,977 | 5/1962 | Koch et al. | 260—29.6 |
| 2,650,909 | 9/1953 | Betsch et al. | 260—318 |
| 3,061,560 | 10/1962 | Kuklkamp et al. | 260—29.6 |
| 3,126,355 | 3/1964 | Birten et al. | 260—29.6 |

MURRAY TILLMAN, *Primary Examiner.*

J. L. WHITE, *Assistant Examiner.*